United States Patent [19]

Murdock et al.

[11] Patent Number: 5,058,693
[45] Date of Patent: Oct. 22, 1991

[54] REMOTE FILTER ASSEMBLY FOR VAPOR RECOVERY SYSTEM

[75] Inventors: Thomas G. Murdock, Northville; Steven G. Mixter, Howell, both of Mich.

[73] Assignee: Industrial Strainer Co., Plymouth, Mich.

[21] Appl. No.: 520,028

[22] Filed: May 7, 1990

[51] Int. Cl.⁵ .............................................. B60K 15/00
[52] U.S. Cl. ................................. 180/69.4; 280/834; 123/519; 55/318; 55/387; 220/85 VR; 220/85 VS
[58] Field of Search .................. 55/316, 318, 320–323, 55/350, 387, 487; 123/519; 220/85 VR, 85 VS, 86.2; 280/834, 135; 180/69.4

[56] References Cited

U.S. PATENT DOCUMENTS

| | | |
|---|---|---|
| 2,952,331 | 9/1960 | Beach ................................. 55/323 |
| 2,976,950 | 3/1961 | Smith ................................... 55/88 |
| 3,191,587 | 6/1965 | Hall .................................... 123/519 |
| 3,721,069 | 3/1973 | Walker ................................ 55/320 |
| 4,024,848 | 5/1977 | Lee ................................ 220/85 VR |
| 4,093,437 | 6/1978 | Ichihara ............................... 55/487 |
| 4,141,703 | 2/1979 | Mulchi ................................ 55/487 |
| 4,929,261 | 5/1990 | Jacobson ............................. 55/321 |

Primary Examiner—Bernard Nozick
Attorney, Agent, or Firm—Charles W. Chandler

[57] ABSTRACT

A fuel vapor recovery system for a vehicle includes a charcoal canister connected to the fuel tank for collecting fuel vapors from the tank as it is being refilled. After the tank is filled and the engine started, the charcoal canister is purged of accumulated vapors. As the canister is being purged, it receives atmospheric air to fill the purged volume. A filter is remotely connected by a hose to the air inlet of the canister. The filter assembly removes dirt, dust, and water from the incoming air.

12 Claims, 2 Drawing Sheets

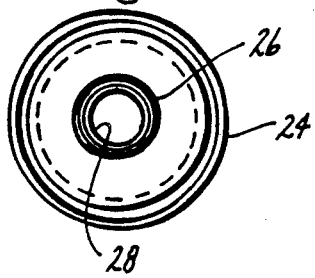
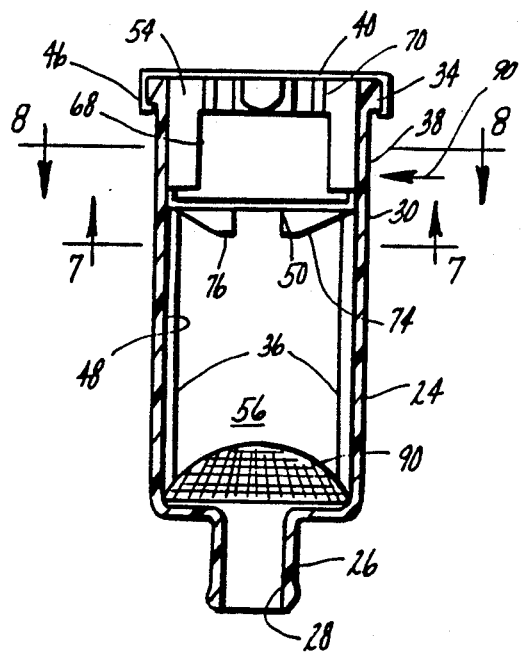
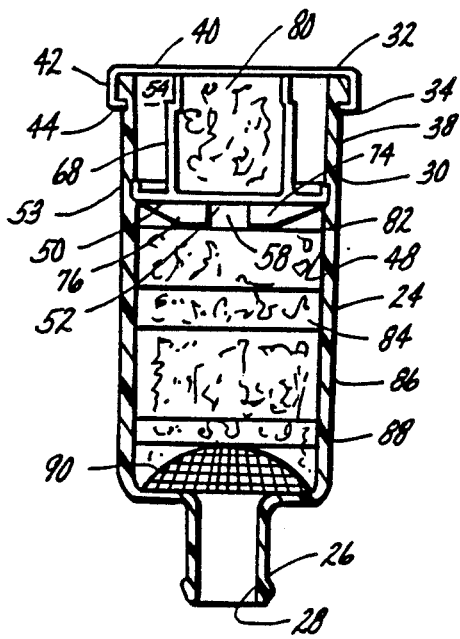
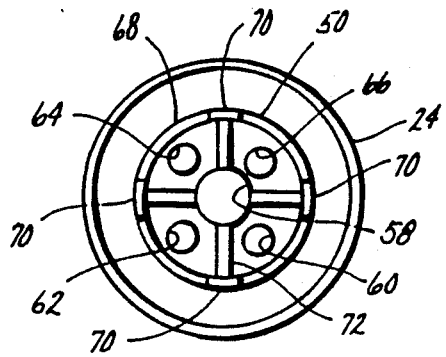
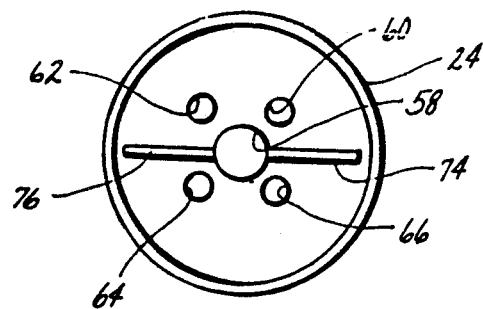

REMOTE FILTER ASSEMBLY FOR VAPOR RECOVERY SYSTEM

BACKGROUND OF THE INVENTION

Certain proposed Environmental Protection Agency regulations require that new gas-powered passenger vehicles be equipped with an on-board fuel vapor recovery system. The system will collect fuel vapors emitted from the gas tank as it is being refueled. A charcoal canister collects and contains these vapors. After the tank is filled with gasoline, and the engine is started, the accumulated vapors pass from the charcoal canister to the engine. Purging of the canister requires make-up air to fill the purged volume. This make-up air must be clean, fresh and dry. Any contaminants such as dirt, dust, or water entering the canister can affect the efficiency and operation of the canister.

The size of the charcoal canister is directly related to the fuel tank volume. A large canister volume requires mounting the canister on the underside of the car.

SUMMARY OF THE INVENTION

The broad purpose of the present invention is to provide a filter assembly connected to the make-up air inlet of the charcoal canister for removing dirt, dust and water. The filter is intended to be mounted in a remote location with respect to the charcoal canister. The location is chosen so as to be protected. The filter is connected by a hose to the canister, remote from the harsh environment of the canister.

The preferred filter includes a tubular housing adapted to be disposed in an upright position with a bottom discharge opening connected by a hose to the canister. The upper end of the housing has an inlet opening for receiving air in a generally horizontal direction. The housing has an internal horizontal flat baffle wall immediately beneath the inlet opening. The baffle wall has centrally disposed openings for passing air from the upper end of the housing toward the lower end.

A tubular baffle is mounted on the horizontal wall adjacent to the air inlet so that moisture in the air tends to be knocked-off and drained out the inlet opening. The air passes upwardly and then reverses direction down through the tubular baffle toward the lower outlet opening. As the air passes through the housing, it progresses through several different types of filter media for removing foreign matter from the air.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 4 is the bottom view of the filter assembly;

FIG. 5 is a longitudinal partially sectional view of the preferred filter assembly with the filter media removed;

FIG. 6 is a longitudinal sectional view of the filter assembly with the filter media in position;

FIG. 7 is a sectional view as seen along lines 7—7 of FIG. 5; and

FIG. 8 is a sectional view as seen along lines 8—8 of FIG. 5.

DESCRIPTION OF THE PREFERRED EMBODIMENT

Figure 2:
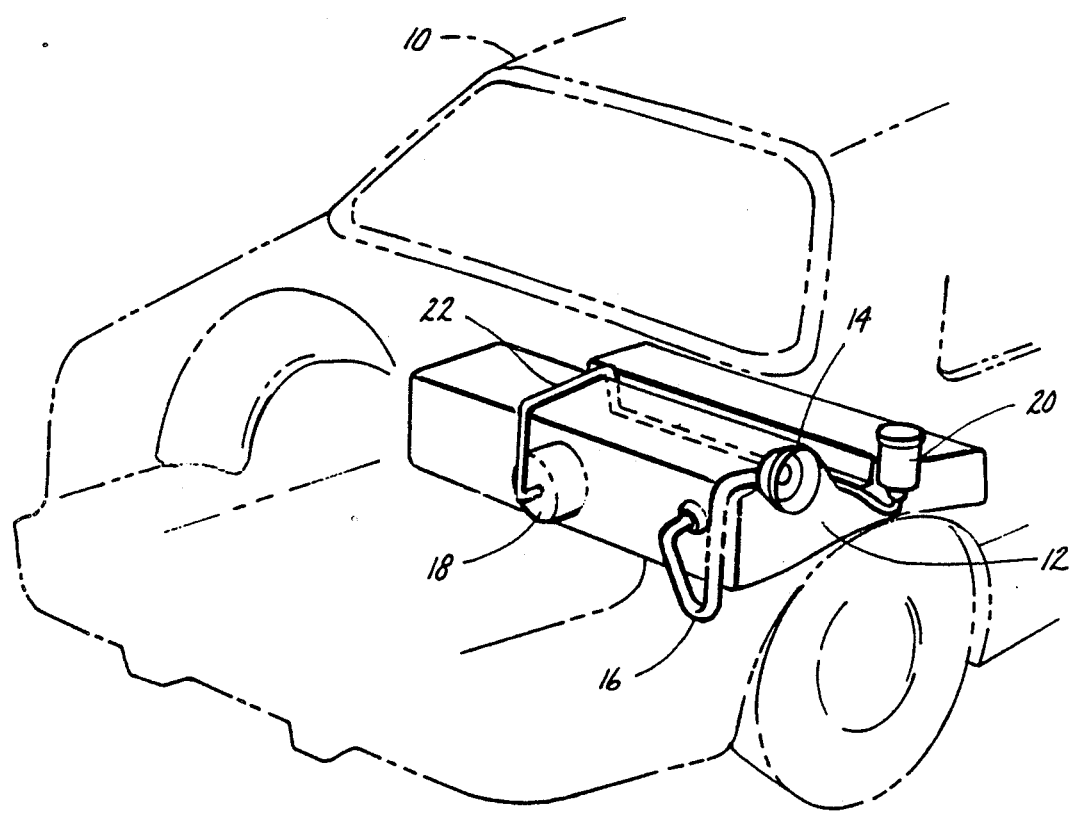
FIG. 2 is a view showing the fuel tank system on an automotive vehicle employing a charcoal canister and the filter assembly of FIG. 1, the vehicle outline being illustrated in phantom lines.

Referring to the drawings, FIG. 2 illustrates the outline of an automotive vehicle 10 having a conventional gas tank 12 with a funnel-shaped opening 14. Gasoline is delivered through opening 14 and conduit 16 for filling the tank. A charcoal canister 18 is mounted on the tank for receiving vapors from the tank as it is being filled to prevent the vapors from exhausting to the atmosphere.

A filter assembly 20 is connected by a conduit 22, such as a flexible hose, to charcoal canister 18. The filter assembly is adapted to receive atmospheric air, filter the air and then pass it to the canister as it is being purged by the engine (not shown). The filter assembly is mounted at a location remote and separate from the canister.

Figure 1:
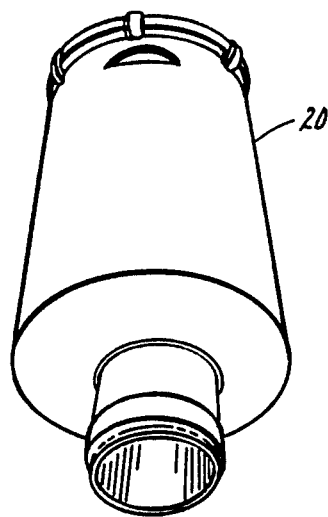
FIG. 1 is a perspective view of a preferred filter assembly.

Referring to FIGS. 1, 2 and 5, filter assembly 20 comprises an elongated, tubular cup-shaped housing 24 formed of a nylon material.

Housing 24 has a small diameter tubular duct 26 defining an outlet opening 28. Duct 26 is adapted to be telescopically received in the end of hose 22.

Housing 24 has an internal annular shoulder 30 spaced from the upper open end 32 of the housing. The upper end of the housing has an annular flange 34 defining the upper edge of the housing. The housing has four internal longitudinally extending rib means 36, as best illustrated in FIG. 5.

Figure 3:
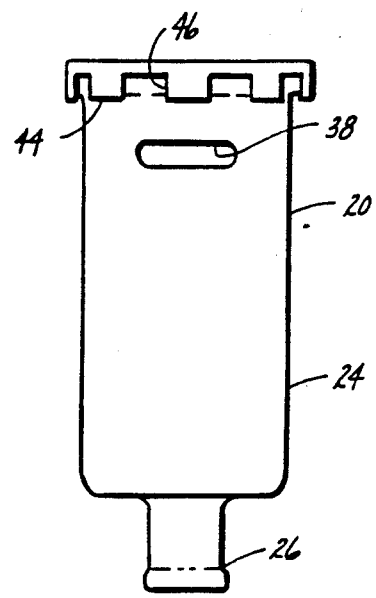
FIG. 3 is an elevational view of the filter assembly.

Referring to FIGS. 3 and 5, the housing has an elongated inlet opening 38 located a short distance above shoulder 30.

A cover 40 having a circular border is mounted on the upper open end of the housing. The cover has a diameter accommodating the diameter of flange 34, and a depending annular skirt 42.

The lower edge of skirt 42 terminates in eight equally-spaced locking lug means 44 which snap around flange 34 to permanently mount the cover on the upper end of the housing. As best illustrated in FIG. 3, locking lug means 44 are spaced from one another by gaps 46 which have a length slightly greater than the width of each lug.

Cover 40 is preferably formed of a nylon material. Cover 40 completely closes off the upper end of the tubular housing. The housing and the cover form an internal filter chamber 48.

A baffle 50 is mounted in the housing. Baffle 50 is a one-piece unit formed of nylon having a flat wall 52 with an annular flange 53 seated on shoulder 30.

Baffle 50 divides the internal chamber into an upper chamber 54 and a lower chamber 56. Baffle 50, as best illustrated in FIG. 7, has a central opening 58 and four spaced, smaller openings 60, 62, 64 and 66. Openings 58–66 are adapted to pass air from upper chamber 54 to lower chamber 56.

The baffle also includes a cylindrical wall 68 which is joined to wall 52 around openings 58 to 66. Wall 68 has a diameter less than the diameter of the housing wall and is spaced from inlet opening 38, as best illustrated in FIGS. 5 and 6. Wall 68 extends from wall 52 to cover 40. Wall 68 has four equally spaced notch means 70 disposed to permit air to pass from inlet opening 38 and around the top of wall 68.

Baffle wall 52 has four short, equally-spaced rib means 72 disposed between each pair of openings 60–66. The lower side of wall 52 also has tapered ribs 74 and 76. The inner edges of ribs 74 and 76 have their greatest depth adjacent opening 58 and then become tapered toward their outer ends adjacent flange 53.

Filter media 80 is disposed inside cylindrical wall 68. Filter media 80 is a pre-filter media formed of 20 PPI SIF foam material.

Four filter elements 82, 84, 86 and 88 are disposed between baffle wall 52 and the bottom of the tubular housing. Filter elements 82 and 86 are formed of a 15 denier polyester fiber felt and are identical in diameter and thickness. Filter media 84, sandwiched between elements 82 and 86, is preferably of a polyester fiber felt material, 40 percent 6 denier, and 60 percent 25 denier.

The bottom filter element 88 is adapted to contain very fine dirt and dust and any fibers which may break loose from the upstream elements. Preferably element 88 is of a 70 PPI SIF II foam.

Referring to FIG. 5, a dome shaped screen 90 is mounted in the bottom of filter chamber 56. The convex part of the screen faces the chamber and has a diameter accommodating the inner diameter of chamber 56. Screen 90 is preferably of a 4×4, 0.025" diameter wire. The screen enlarges the bottom surface area of filter element 88 facing outlet opening 28 to improve the air circulation through chamber 56.

Referring to FIGS. 5 and 6, the air passes in the direction of arrow 90 through inlet opening 38, toward baffle wall 68. Wall 68 changes the direction of the air toward the cover, and causes water droplets and moisture to collect on top of wall 52 and drain out the inlet opening. The air passes radially inwardly through notch means 70 and then downwardly through the inside of the cylindrical baffle wall 68 where it passes through filter media 80.

As the air progresses downwardly, it passes through openings 58, 60, 62, 64, and 66 into lower chamber 56. Baffle ribs 74 and 76 depress filter media 82 away from the bottom of the baffle to enlarge the top area of the filter media. The air then passes through filter element 82 which is a low density filter and creates a velocity decrease for the incoming contaminants. The air passes through filter element 84 which traps the fine dust. The air passes through filter element 86 and then finally through the final stage of filtration through element 88 which removes very fine dirt and dust and any fine fibers which may have broken loose from the other elements. The air then passes through screen 90 and out outlet opening 28 toward the charcoal canister.

The filter assembly can be located in a position best suited for the incoming air, which may not be the location best suited for the charcoal canister.

Having described my invention, I claim:

1. In combination with an automotive vehicle having a gas tank for receiving a liquid fuel, a charcoal canister connected to the gas tank for receiving gasoline vapors and having an opening for receiving atmospheric air as the charcoal canister is being purged, said canister being located in near proximity to the gas tank, the improvement comprising:

an air filtration means located in spaced relation to the charcoal canister; and a conduit means extending between the air filtration means and the canister;

said air filtration means comprising an upright tubular housing located alongside the gas tank at a point that is at least partially protected from mud splashing off the road surface; said tubular housing having a raw air inlet opening therein near its uppermost extremity; said tubular housing having a clean air discharge duct extending from its lowermost extremity; said tubular housing having an internal space, and a filter packing within said internal space so that air flows downwardly through the packing as it moves from the inlet opening to the discharge duct; said conduit means comprising a hose extending between the discharge duct and the opening in the charcoal canister.

2. The improvement of claim 1 wherein said upright tubular housing has an annular side wall; said raw air inlet opening being configured as a circumferentially extending slot in said annular side wall, said slot being located relatively close to the upper extremity of the tubular housing and relatively remote from the lower extremity of the tubular housing.

3. The improvement of claim 1, wherein said filter packing comprises a plural number of porous disks stacked one below another in the tubular housing; said porous disks having differing porosities.

4. The improvement of claim 1, wherein said hose is a flexible hose having one end thereof telescoped onto the discharge duct of the tubular housing.

5. In combination with an automotive vehicle having a gas tank for receiving a liquid fuel, a charcoal canister connected to the gas tank for receiving gasoline vapors therefrom and having an opening for receiving atmospheric air as the charcoal canister is being purged, the improvement comprising:

an air filtration means located remote from and separate from the charcoal canister; and a conduit means extending between the air filtration means and the canister;

said air filtration means comprising an upright tubular housing having an annular side wall and a bottom wall; said annular side wall having a raw air inlet opening therein whereby atmospheric air flows generally horizontally through the inlet opening to enter into the housing; said bottom wall having a clean air discharge duct extending therefrom for connection to the aforementioned conduit means;

said air filtration means further comprising a baffle structure subdividing the housing into an upper chamber and a lower chamber; said raw-air inlet opening being in fluid communication with the upper chamber; said baffle structure including an annular wall operable to intercept air flowing from the inlet opening so that non-gaseous particulates in the incoming stream are separated from the flowing air by inertial separator action;

said air filtration means further comprising an air filtration porous mass substantially filling the lower chamber in the tubular housing so that air flowing downwardly through the housing is in a substantially cleaned condition when it enters the clean air discharge duct.

6. The improvement of claim 5, wherein said baffle structure is separate from the tubular housing, whereby the baffle structure can be inserted downwardly into the housing after the porous mass has been placed within the housing.

7. The improvement of claim 5, and further comprising a dome-shaped screen seated on the bottom wall of the tubular housing; said porous mass being seated on the screen so that the entire lower face of the porous mass is in fluid communication with the discharge duct via the screen.

8. The improvement of claim 5, wherein said raw-air inlet opening is configured as a circumferentially extending slot in the annular side wall of the tubular housing.

9. In combination with an automotive vehicle having a gas tank for receiving a liquid fuel, a charcoal canister connected to the gas tank for receiving gasoline vapors therefrom and having an opening for receiving atmospheric air as the charcoal canister is being purged, the improvement comprising:

an air filtration means located remote from and separate from the charcoal canister; and a conduit means extending between the air filtration means and the canister;

said air filtration means comprising an upright tubular housing having a vertical central axis; said housing comprising an annular side wall, a top cover (40), a bottom wall, and a clean air tube (26) extending downwardly from said bottom wall;

said conduit means having one end thereof telescoped onto said clean air tube to conduct clean air from the air filtration means to the charcoal canister;

said tubular housing having a raw-air inlet opening in its annular sidewall, said air inlet opening being located a relatively short distance below the top cover so that raw air flows generally horizontally as it enters into the upper portion of the tubular housing;

said air filtration means further comprising a baffle means (50) within the tubular housing; said baffle means comprising a horizontal transverse wall (52) subdividing the tubular housing into an upper chamber and a lower chamber, and an annular upstanding baffle wall (68) extending upwardly from said transverse wall; said transverse wall being located near the lower edge of the raw air inlet opening so that condensate in the raw air can drain through the inlet opening out of the housing;

said annular upstanding baffle wall being oriented to direct the incoming air from the inlet opening upwardly toward the top cover and then downwardly through the space circumscribed by the annular upstanding baffle wall, whereby non-gaseous particulates in the incoming stream are separated from the stream by inertial separator action;

said air filtration means further comprising a porous air filtration media substantially filling the lower chamber in the tubular housing.

10. The improvement of claim 9, wherein said horizontal transverse wall has a number of flow openings therethrough communicating the space within the annular baffle wall with the lower chamber; said transverse wall having a plural number of downwardly projecting ribs engageable with the porous air filtration media so that the media is spaced downwardly away from said flow openings in the transverse wall.

11. The improvement of claim 9, wherein said baffle means is formed as a removable insert installable in the tubular housing after placement of the air filtration media in the housing; said annular upstanding baffle wall having an upper edge engaged with the top cover to prevent movement of the baffle means; the upper edge of the annular baffle wall having a number of notches therein for enabling air to pass from the space surrounding the baffle wall to the space circumscribed by the baffle wall.

12. In combination with an automotive vehicle having a gas tank for receiving a liquid fuel, the gas tank being located in the rear of the vehicle, a charcoal canister located adjacent the gas tank, in the rear of the vehicle, and being connected to the gas tank for receiving gasoline vapors therefrom, and the canister having a canister opening for receiving atmospheric air as the charcoal canister is being purged, the improvement comprising:

a filter housing having an internal filter chamber, the chamber having an outlet opening for passing air to the charcoal canister through said canister opening;

said housing having inlet opening means for receiving atmospheric air into the internal filter chamber for passage through the chamber;

a filter media disposed in said internal filter chamber between the inlet opening and the outlet opening for removing material from the atmospheric air as it passes through the internal filter chamber between the inlet opening and the outlet opening; and conduit means connecting the outlet opening of the filter housing to the opening of the charcoal canister such that the filter housing may be located in the rear of the vehicle in a position remote from and spaced from the charcoal canister.

* * * * *